Patented Aug. 15, 1939

2,169,278

UNITED STATES PATENT OFFICE 2,169,278

METHOD OF MANUFACTURING FLAVORING FOR ALIMENTARY PRODUCTS

Herbert E. Otting, Westerville, Ohio, assignor to M & R Dietetic Laboratories, Inc., a corporation of Ohio No Drawing. Application August 4, 1938, Serial No. 223,121

18 Claims. (Cl. 99—140)

The present invention relates to improvements in flavoring materials for alimentary products and more particularly to flavoring material intended for use in the manufacture of confections such as milk-chocolate and butter-cream candies, oleomargarines, various bakery products and the like, in which a distinctive and permanent butter-like flavor and taste is desired and to methods of preparing the same.

In my prior Patent No. 1,966,460, issued July 17, 1934, I described and claimed a method for imparting a desired butter-like taste to alimentary products such as chocolate. In accordance with that invention a high butter-fat containing material such as cream was subjected to the action of a suitable lipolytic enzyme such as lipase or steapsin until the desired amount of free fatty acids were developed. The lipolyzed cream was diluted with a suitable proportion of water and heated to a temperature and for a time sufficient to destroy the enzymes. The product was cooled, mixed with a suitable carrier such as a concentrated or evaporated skim milk and used as such or subjected to a suitable spray drying operation. The resulting powder, containing the lipolyzed products of the butter-fat containing material, was then mixed with alimentary products to impart a characteristic butter-like taste thereto.

In the lipolyzed butter-fat containing material or culture prepared in accordance with my prior patent, I have noticed that there are or may be present the undesirable flavor and taste of the enzyme along with other off-flavored materials which are developed during lipolysis or subsequently thereto. In addition the final step of spray drying the lipolyzed products with the carrier caused a considerable loss of valuable constituents due to the incident steam distillation effect on the lighter volatile constituents of the fat or oil present, and the consequent loss of some of the volatile odors and flavors that are highly desirable. Moreover, since the lipolyzed produces are incorporated in a whole milk powder carrier and since some milk powders are not suitable for some purposes, it becomes necessary for a manufacturer to have on hand more than one kind of whole milk powder carrying the desired flavoring.

In accordance with the present invention, I form the culture by the lipolytic action of enzymes as in my prior patent and then subject the culture, preferably without dilution, to a suitable temperature to destroy the enzymes. The culture in this form is an emulsion of the oil-in-water type and this emulsion, while at a temperature above the melting point of its fat content, is placed in a conventional centrifugal separator to separate and remove the aqueous phase from the oil phase. In this separation, there occurs an unexpected and unexplained selective action, and the aqueous phase carries with it a small proportion of the free fatty acids which appear to be those having undesirable penetrating odors, together with the constituents imparting the undesirable taste and flavor of the enzyme and other off-flavored materials, whereas the oil phase retains practically all of the desirable free fatty acids having the property of imparting pleasing butter-like flavor developed during the lipolysis of the butter-fat.

By operating in accordance with the present invention, I produce a substantially non-aqueous liquid milk product containing substantially all of the desired butter-like flavors and taste and which blends readily with a chocolate coating, oleomargarine, or other alimentary compositions. The constancy of my novel product can be readily controlled and it is found that the desired flavor characteristics are permanently stabilized therein.

In carrying out the present invention, the lipolysis of the butter-fat in the butter-fat-containing material, such as whole milk, butter-fat containing emulsions, cream and the like, may be effected by bacterial action or preferably by the use of lipolytic enzymes. The enzyme employed in the treatment of the butter-fat-containing material may be lipase although I prefer to employ a suitable lipolytic enzyme which is more readily available commercially, such as steapsin. I have found the following procedure suitable for use in effecting the lipolysis of the butter-fat-containing material.

A separated cream, suitably containing in excess of 15% butter-fat and preferably about 40%, is heated to a temperature, say above 145° F. for a short period to reduce as far as possible its content of bacterial organisms, particularly of the non-spore forming type. The cream is then cooled to between 100° and 110° F. and is inoculated with a suitable proportion of powdered steapsin, previously thoroughly dissolved in a small quantity of water. The proportion of steapsin used is determined to secure the desired extent of lipolysis. In general, from 0.05% to 0.2% is sufficient, and I have found about 0.1% of an average commercial product to be adequate in the treatment of 40% butter-fat cream. The cultured cream is maintained between 100° and 110° F. for a period sufficient to secure a development of at least 5% to 6%, preferably about 12 to 20% and particularly 15 to 18% of free fatty acids (calculated as oleic acid). Ordinarily a culture period of about 20 to 25 hours is sufficient to secure the desired development of free fatty acids. It is readily apparent that when a higher proportion of free fatty acids is desired, the period of lipolysis may be extended or the proportion of the lipolytic enzyme increased.

After the desired proportions of free fatty acids have been developed, the treated cream, preferably without dilution, is heated to a temperature such that the lipolytic enzyme is destroyed. This may be accomplished by heating to a temperature of about 145° to 160° F. for about 20 to 30 minutes. The lipolyzed material is then cooled slightly to a temperature above the melting point of the butter-fat, say about 120° to 140° F. and in such a manner as to prevent the loss of desired volatile flavors and odors. Upon inspection is it found to be in the form of an emulsion of the oil-in-water type in which the discrete particles of fatty material which include the free fatty acids that are preferentially soluble in the oil phase in the presence of the water phase, are uniformly dispersed throughout the continuous aqueous phase. The emulsion, at a temperature in the order of about 140° F., is then centrifuged in a conventional centrifugal oil separator to separate the discontinuous oil phase, containing the non-lipolyzed butter-fat and the free fatty acids, from the continuous aqueous phase. At this temperature, there is very little difficulty in separating the two phases.

The oil phase is found to contain substantially all of the free fatty acids of a desirable character with respect to taste and flavor that are developed during lipolysis of the cream and the non-lipolyzed butter-fat along with an inconsequential amount of moisture usually in the order of 0.01–0.05%. The resulting oil is a substantially 100% fat and fat-soluble non-alkaline product which gives a very clean characteristic butter or milk-like flavor and which lends itself to ready incorporation into food products, particularly chocolate products, margarines and the like without causing undesirable changes in their physical characteristics. The aqueous phase is found to contain the undesirable taste and flavor producing constituents of the lipolyzed product, including a minor proportion of preferentially water-soluble free fatty acids in the order of about 3% to 4% or less, together with those derived from the enzyme, curd, and the like.

The following example sets forth a specific operation in accordance with this invention, it being understood that the details set forth are not intended to be regarded as limitations upon the scope of the invention, but as merely illustrative thereof.

325 lbs. of 40% butter-fat cream are heated to a suitable temperature for the destruction of bacteria, say 190° F., for approximately 20 minutes and are then cooled to from 103 to 105° F., and are inoculated with 151 grams of steapsin dissolved in a small amount of water. The temperature is maintained for a period sufficient for the development of the desired amount of free fatty acids. At the end of 22 hours, titration shows the content of free fatty acids (calculated as oleic acid) to be 13.1%, the cream at this time having a highly penetrating and accentuated butter-like odor. The lipolyzed cream is then placed in a closed container and heated to a suitable temperature, say about 145° F. to 155° F. for about 30 minutes to destroy the enzyme.

The lipolyzed cream, in the form of an emulsion is then cooled to a temperature above the melting point of butter-fat, say about 125 to 140° F. The cooled emulsion at about this temperature is removed from the container and is centrifuged in a conventional centrifugal oil separator, preferably of a high speed type to separate the desired oil phase from the undesirable water phase. The oil phase contains about 32.9% of free fatty acids and about .03% of moisture. The water phase contains the undesirable off-flavors, flavors of the steapsin, etc., as well as the slight amount of curd present in the cream, along with only about 3% of free fatty acid (calculated as oleic acid). Obviously, the amount of free fatty acids present in the cultured cream and hence in the oil phase can be increased at will by controlling the quantity of enzyme used, the time period during which lipolysis takes place or both. Thus, if desired, the quantity of free fatty acid present in the oil phase can be increased to say 40 to 50% and even more, or if desired, it can be as low as 12 to 13%.

The liquid oil phase is substantially moisture-free and has a very clean and characteristic butter-like flavor of highly accentuated character and can be used as such to impart the desired butter-like flavor to alimentary products; for example, in salt-rising bread or other bakery products or in oleomargarines, mayonnaise and other salad dressings, and in milk products which are to be employed in the manufacture of certain cheese products; or to impart a desired characteristic butter-like flavor to edible animal or vegetable oils or fats or to hydrogenated oils or fats or to mixtures thereof. The oils or fats, whether hydrogenated or not, which may be thus flavored include soy bean oil, olive oil, castor oil, cottonseed oil, cocoanut oil, oleo-stearine, lard and the like oils and fats suitable for shortening, for incorporation into margarines or for other edible purposes.

If desired, the butter-like flavoring oil can be used in association with a suitable carrier. Thus, the non-aqueous oil can be atomized or sprayed onto or otherwise incorporated into carriers such as skim or whole milk powders and a sufficient amount of the carriers with their associated flavoring can be blended into margarine emulsions or with powdered whole milk or other alimentary products sold by confectioners or bakers, or prepared by the housewife. In the preparation of oleomargarines the carrier for the flavoring material is preferably a skim milk or a skim milk powder. If desired, the oil product containing the flavor producing free fatty acids, prepared in accordance with the present invention, may be incorporated in a suitable proportion of a stable edible oil, thereby materially stabilizing the product and decreasing or inhibiting its tendency to oxidize. Thus mixtures of about equal proportions of the oil product and cocoa-butter have been found to be satisfactorily stable products; these proportions may, if desired, be widely varied.

The oil embodying my invention is especially suitable for incorporation in chocolate coating compositions or chocolate candies. I have found that from about .12 to .15% of this oil will impart an excellent butter-like flavor and odor to chocolate coatings. In view of the moisture-free character of this oil, it can be added during any stage of the manufacture of coating or eating chocolate and gives substantially uniform results. Moreover, the addition of this oil to a chocolate composition after the conching stage is not precluded, as heretofore, since the absence of moisture obviates crystallization of sugar and thickening of the chocolate mass. The butter-like flavoring oil can be standardized to a definite free fatty acid content and thus impart to alimentary products, such as chocolate, uniform flavoring characteristics.

The oil when introduced into a chocolate mass, modifies its viscosity and imparts to it a smoother texture and easier working qualities and is also effective in preventing bloom. The addition of small amounts of this oil to a chocolate coating composition appears to lower the physical and working properties thereof to a marked degree.

The term oleomargarine as used in the specification and claims includes all types of edible emulsions of oleaginous and aqueous substances. The oleaginous substances may be of vegetable or animal origin, or mixed, hydrogenated if desired, or mixtures of hydrogenated and unhydrogenated oleaginous substances. The aqueous substances may be sweet milk, soured or cultured milk, whey, plain water, salt solutions, or in fact, any edible aqueous medium.

This application is a continuation-in-part of my prior copending application entitled Method of manufacturing flavoring for alimentary products, Serial No. 124,041, filed February 4, 1937.

I claim:

1. The method of producing a material for imparting a butter-flavor to chocolate and other alimentary products which comprises subjecting a butter-fat-containing aqueous material to lipolysis to develop therein free fatty acids and subjecting the lipolyzed butter-fat-containing material to a separatory treatment to separate the substantially non-aqueous constituents which include the non-lipolyzed butter-fat and the preferentially oil-soluble free fatty acids developed during such lipolysis, whereby a substantially water-free oily flavoring material is secured.

2. The method of producing a material for imparting a butter-flavor to chocolate and other alimentary products which comprises subjecting a butter-fat-containing aqueous material to lipolysis to develop therein free fatty acids, stabilizing the butter-fat-containing lipolyzed fluid to arrest further lipolytic activity when the desired quantity of free fatty acids are developed and subjecting the lipolyzed butter-fat-containing material to a separatory treatment to separate the substantially non-aqueous constituents which include the non-lipolyzed butter-fat and the preferentially oil-soluble free fatty acids developed during such lipolysis, whereby a substantially water-free oily flavoring material is secured.

3. The method of producing a material for imparting a butter-flavor to chocolate and other alimentary products which comprises subjecting a butter-fat-containing aqueous material to lipolysis to develop therein free fatty acids, destroying the lipolytic agent when the desired quantity of free fatty acids are developed and subjecting the lipolized butter-fat-containing material to a separatory treatment to separate the substantially non-aqueous constituents which include the non-lipolyzed butter-fat and the preferentially oil-soluble free fatty acids developed during such lipolysis, whereby a substantially water-free oily flavoring material is secured.

4. The method of producing a material for imparting a butter-flavor to chocolate and other alimentary products which comprises subjecting a butter-fat-containing aqueous material to a lipolytic enzyme to develop therein free fatty acids, destroying the enzyme when the desired quantity of free fatty acids are developed and subjecting the lipolyzed butter-fat-containing material to a separatory treatment at a temperature above the melting point of the fats therein to remove the substantially non-aqueous constituents which include the non-lipolyzed butter fat and the preferentially oil-soluble free fatty acids developed during lipolysis.

5. The method set forth in claim 4 in which the butter-fat-containing material is in a non-alkaline condition.

6. The method of producing a material for imparting a butter-flavor to chocolate and other alimentary products which comprises subjecting a butter-fat-containing aqueous fluid to the action of steapsin while maintaining it at a temperature of 100° to 110° F. to secure development of additional fatty acids therein, heating the liquid to a temperature of 145° to 160° F. to destroy the steapsin, and centrifuging the resulting material while maintaining it at a temperature at which the lipolyzed butter-fat is in molten state whereby a substantially moisture-free oily material is secured containing the preferentially oil-soluble free fatty acids resulting from the lipolysis and free from undesirable odors and flavors.

7. The method of imparting a characteristic and permanent butter-like flavor to an edible powdered material adapted for use in the preparation of edible products which comprises spraying on said material a substantially moisture-free liquid lipolyzed butter-fat containing the preferentially oil-soluble free fatty acids developed during lipolysis, from which preferentially water-soluble free fatty acids developed during lipolysis are removed.

8. The method of imparting a characteristic and permanent butter-like flavor to a powdered whole milk which comprises incorporating in said powder small amounts of a substantially moisture-free liquid lipolyzed butter-fat containing the preferentially oil-soluble free fatty acids developed during lipolysis, from which preferentially water-soluble free fatty acids developed during lipolysis are removed.

9. The method of imparting a characteristic and permanent butter-flavor to alimentary products which comprises incorporating therewith milk solids treated with a non-aqueous liquid lipolyzed butter-fat containing the preferentially oil-soluble free fatty acids developed during lipolysis, from which preferentially water-soluble free fatty acids developed during lipolysis are removed.

10. As an article of manufacture, an edible carrier having uniformly dispersed therein small amounts of a substantially moisture-free liquid lipolyzed butter-fat containing preferentially oil-soluble free fatty acids and being largely free from its preferentially water-soluble free fatty acids.

11. As a new article of manufacture, a vegetable oil or fat containing lipolyzed butter-fat containing preferentially oil-soluble free fatty acids and being largely free from its preferentially water-soluble free fatty acids.

12. As a new composition of matter, a chocolate mass containing lipolyzed butter-fat containing preferentially oil-soluble free fatty acids and being largely free from its preferentially water-soluble free fatty acids.

13. The method of imparting a characteristic and permanent butter-flavor to chocolate which comprises incorporating therewith a non-aqueous liquid lipolyzed butter-fat containing the preferentially oil-soluble free fatty acids developed during lipolysis, from which preferentially water-soluble free fatty acids developed during lipolysis are removed.

14. The method of preparing chocolate which comprises incorporating into a chocolate mass substantially water-free oily material comprising lipolyzed butter-fat containing at least 12 to 13% of preferentially oil-soluble free fatty acids resulting from lipolysis.

15. As a butter-like flavoring material, a lipolyzed butter-fat in oil form having a clean butyric acid flavor and free from all off-flavors, containing its preferentially oil-soluble free fatty acids and being largely free from its preferentially water-soluble free fatty acids.

16. As an article of manufacture, powdered milk containing lipolyzed butter-fat containing preferentially oil-soluble free fatty acids and being largely free from its preferentially water-soluble free fatty acids.

17. As a new article of manufacture, an oleaginous substance selected from the class consisting of vegetable or animal oils or fats, hydrogenated vegetable or animal oils or fats, and mixtures thereof having therein lipolyzed butter-fat containing its preferentially oil-soluble free fatty acids and being largely free from its preferentially water-soluble free fatty acids.

18. As a new article of manufacture, oleomargarine having therein lipolyzed butter-fat containing its preferentially oil-soluble free fatty acids and being largely free from its preferentially water-soluble free fatty acids.

HERBERT E. OTTING.